Dec. 8, 1964   D. H. RAYBOULD   3,160,264
CONVEYOR CHAIN
Filed Jan. 16, 1963
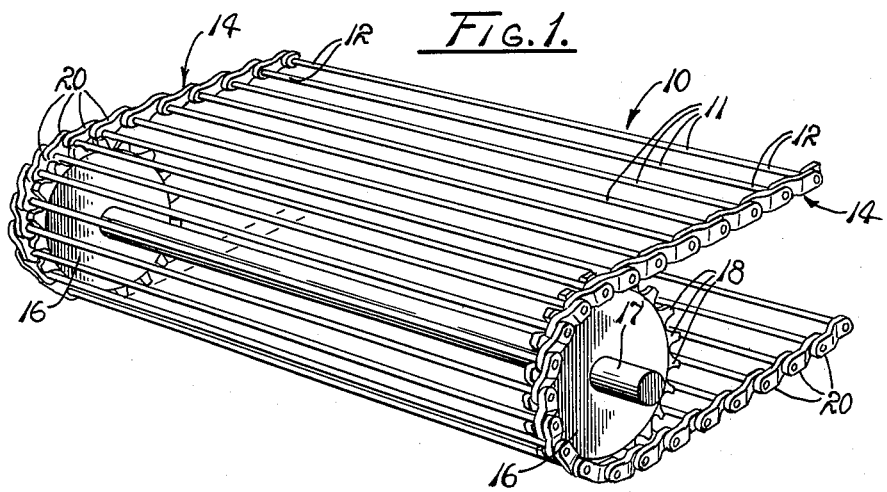
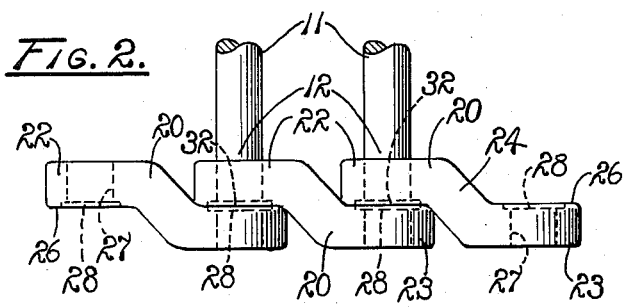
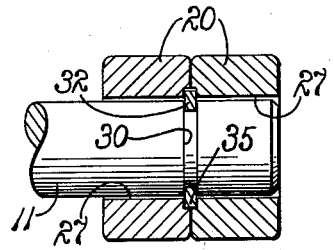
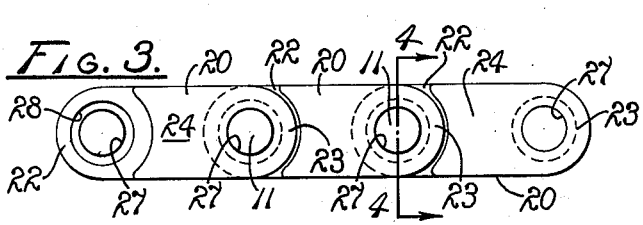
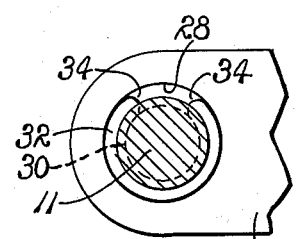
DELMAR H. RAYBOULD
INVENTOR
Huebner & Worrel
ATTORNEYS

United States Patent Office 3,160,264
Patented Dec. 8, 1964

3,160,264
CONVEYOR CHAIN
Delmar H. Raybould, P.O. Box 657, Rexburg, Idaho
Filed Jan. 16, 1963, Ser. No. 251,887
4 Claims. (Cl. 198—195)

The present invention relates to a conveyor chain for use in potato harvesters and other similar agricultural harvesting machines and more particularly to such a conveyor chain having spaced material supporting flight rods and articulated connecting links which are held in assembly by a single constraining member between the links to preclude relative axial movement of the links on the rods. While the conveyor chain of the present invention is described for illustrative convenience as employed in potato harvesters and the like, it is apparent that it has utility in other operational environments.

Conventional conveyor chains employed on potato harvesters and the like usually consist of a plurality of spaced flight rods interconnected at their opposite ends by sets of continuous chains of articulated links. The rods usually employ large flanged integral heads, removable lock nuts, cotter keys or other similar constraining devices outwardly of the links to prevent the links from sliding off the ends of the rods. Since the assembly of such constraining devices is both tedious and time-consuming, frequently no provision is made for limiting inward movement of the links on the rods. When such movement occurs, the ends of the rods protrude outwardly of the sides of the chain where they are exposed to damage by catching on adjacent conveyor supporting structure or become entangled with vines, weeds, and other trash which is pulled onto the conveyor and intermixed with the crop being harvested. Also, during such inward displacement, the links are subject to damage from engagement with drive sprockets, idlers, or other conveyor supporting structure.

There are also conventional conveyor chains utilizing spaced flight rods having opposite ends interconnected by hooks. These chains are characterized by entanglement with crops and debris during operation, lack of desired durability, a tendency to misalign and to incur accompanying stress and wear as well as to impose undue stress and wear on mounting sprockets therefor.

Therefore, it is an object of the present invention to provide an improved conveyor chain for potato harvesters and the like.

Another object is to provide a flight-bar conveyor chain having smoother side edges than those now employed.

Another object is to provide an improved conveyor chain having material supporting flight rods and sets of interconnecting articulated links capable of maintaining precise alignment for smooth, continuous travel with a minimum of wear of itself and associated structure.

Another object is to provide such a conveyor chain having a single link constraining member on the rods between pairs of links to preclude axial displacement of the links in either direction.

Another object is to provide a conveyor chain of the character described wherein the link constraining member is shielded to preclude damage or inadvertant removal.

Another object is to provide such a conveyor chain having an enclosed link constraining member which can be easily inserted and removed for fast and convenient assembly and disassembly of the conveyor.

Other objects and advantages of the present invention will subsequently become apparent upon reference to the following description.

In the drawing:
FIG. 1 is a fragmentary perspective of the conveyor chain of the present invention shown in an assembled operating position.

FIG. 2 is a somewhat enlarged fragmentary top plan view of the articulated connections between the rod and links.

FIG. 3 is a fragmentary side elevation of the rod and links of FIG. 2.

FIG. 4 is a somewhat enlarged transverse vertical section through the articulated connection between the rod and links taken on line 4—4 of FIG. 3.

FIG. 5 is a somewhat enlarged fragmentary partial section through a flight rod with the outer link removed.

FIG. 6 is a fragmentary top plan view similar to FIG. 2 showing the adjacent ends of a pair of links spread to expose the link constraining member therebetween.

Referring more particularly to the drawing, a conveyor chain embodying the principles of the present invention is generally indicated by the reference numeral 10. The chain provides a plurality of equally spaced, parallel, transversely extended flight rods 11 having opposite end portions 12. An articulated link chain 14 is pivotally mounted at each of the opposite ends of the rods in interconnecting relation between the rods which are adjacent longitudinally of the conveyor. The conveyor chain 10 is adapted to be supported and driven in a circuitous path of travel by a pair or more sets of sprocket wheels 16, one set of which is shown in FIG. 1. The sprockets of each set are mounted upon an axially disposed shaft 17 which is rotatably journaled in a suitable supporting frame, not shown. The sprockets conventionally provide a plurality of peripherally extended teeth 18 which are received in the spaces between the flight rods 11 and through rod engagement support and/or drive the conveyor chain.

Each of the link chains 14 includes a plurality of elongated links 20 having opposite inner and outer off-set ends 22 and 23, respectively, joined by an integral angularly disposed intermediate portion 24. Opposite ends of each link provide oppositely laterally disposed annular bearing surfaces 26. For purposes soon to become apparent, said surfaces are preferably disposed in a common plane longitudinally of their link. When the links are interconnected, the planes of their bearing surfaces are aligned. The ends also include bores 27 therethrough normal to said bearing plane and of a diameter slightly larger than the diameter of the rods 11, thereby to receive the rods in axially sliding rotatable relation. The bearing surfaces 26 have enlarged counterbores 28 in circumscribing relation to the bores 27, as best seen in FIG. 5.

As best shown in FIG. 4, the end portions 12 of the rods each have a circumscribing groove 30 formed therein a distance from their respective ends corresponding to the width of the links 20. A snap ring 32 has a pair of opposite ends 34 spaced a circumferential distance apart easily to permit insertion and removal of the snap ring within the annular groove 30 in the rods. With the adjacent inner and outer ends 22 and 23 of adjacent links positioned on the ends of the rods, as in FIGS. 2 and 4, the outer peripheral portion of the snap ring is received within an annular chamber 35 formed by the combined dimensions of the counterbores 28. It is noted that in such position, the matching bearing surfaces 26 of the inner and outer ends of adjacent links are disposed in intimate facing engagement in covering relation to the snap rings 32. It is also significant that the ends of the rods 11 are substantially flush with the outer surfaces of the links 20 thereby providing a relatively smooth outer edge surface for the conveyor chain 10.

*Operation*

The operation of the described embodiment of the subject invention is believed to be clearly apparent and is briefly summarized at this point. In assembling the conveyor chain 10, the adjacent links 20 are positioned with their matching bearing surfaces 26 in facing contact so as to align the axial bores 27 of each pair of links for sliding said mating ends of the links upon the rods 11. As described, the bores 27 are somewhat larger than the diameter of the rods to that the links may be angularly tilted sufficiently to permit connecting the ends of the conveyor chain in the desired endless operating position. Also, the rods are permitted freely to rotate thus insuring even wear within the bores and on the portion of the rods contacting the sprocket teeth 18.

In order to constrain the links and rods in such operating position, a snap ring 32 is introduced between each pair of matching bearing surfaces 26 of the links and into the adjacent groove 30 of the rod on which the links are mounted. Such placement is accomplished by the introduction of any suitable prying tool between the bearing surfaces of the links to spread the links sufficiently for introducing the snap ring therebetween. After removal of the tool, the links assume a position with their respective bearing surfaces in facing contact and with the snap ring housed by the links.

The snap rings 32 prevent axial displacement of the links on the rods in either direction. The ends of the links which are outwardly overlapped by mating links cannot move outwardly because of the snap rings outwardly thereof. The ends of the links which outwardly overlap the ends of mating links cannot move inwardly because of the snap rings inwardly thereof. Since the links are journaled on the rods 11, they cannot cock appreciably thereon. Therefore the outer end of each link is held against further outward movement by its inner end and the inner end of each link is held against further inward movement by its outer end. Thus, each snap ring 32 is effective to preclude axial movement of a particular link in one direction relative to its respective rod and at the same time is effective to preclude axial movement of the mating link on the same rod in the opposite axial direction. Therefore, with this arrangement only one snap ring is required at each articulated connection of the links of the conveyor chain.

In view of the foregoing, it is apparent that the present invention has provided an improved conveyor chain which eliminates the conventional outward projecting link constraining members for a smoother operating conveyor chain which is less susceptible to damage and wear. The counterbored links 20 enclose the snap rings 32 thereby shielding them from damage and inadvertent removal from their link constraining positions. Furthermore, the chain links present a relatively smooth outer edge surface which minimizes inadvertent engagement of the ends of the rods with adjacent supporting structure and from snagging and intermixing extraneous material with material on the conveyor.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A conveyor chain comprising a plurality of substantially parallel flight rods having opposite end portions; a plurality of substantially identical elongated links interconnecting corresponding ends of the adjacent rods in an endless chain, each link having an outer end providing an inwardly disposed bearing surface, an inner end longitudinally spaced from said outer end providing an outwardly disposed bearing surface in a plane common to the inwardly disposed bearing surface of the outer end, a central portion integrally interconnecting the outer and inner ends and a pair of substantially parallel bores individually extended through the opposite ends of the links, the links having opposite ends journaled on corresponding ends of adjacent rods, the inner ends of the links being outwardly overlapped by the outer ends of adjacent links; and link restraining means mounted on the rods between the overlapped ends of the links.

2. A conveyor chain comprising a plurality of substantially parallel flight rods having opposite end portions; a plurality of substantially identical links interconnecting corresponding ends of the adjacent rods in an endless chain, each link having an outer end providing a substantially flat inwardly disposed bearing surface, an inner end providing a substantially flat outwardly disposed bearing surface disposed in a plane common to the inwardly disposed bearing surface of the outer end, a central portion integrally interconnecting the outer and inner ends and a pair of substantially parallel bores individually extended through the opposite ends of the links normal to the plane of the bearing surface, counterbores substantially concentric to the bores in the bearing surfaces, the links having opposite ends journaled on corresponding ends of adjacent rods, the inner ends of the links being outwardly overlapped by the outer ends of adjacent links with the bearing surfaces of the links in facing engagement and with the counterbores of the links in juxtaposition; and link restraining means housed in the counterbores mounted on the rods between the overlapped ends of the links.

3. A conveyor chain comprising a plurality of spaced substantially parallel flight rods having opposite ends; a plurality of substantially identical elongated undulated links providing longitudinally spaced outwardly and inwardly facing bearing surfaces disposed in a substantially common plane longitudinally of the link and of the conveyor, said links including spaced substantially parallel transversely oppositely displaced bores therethrough to receive the ends of the rods with the oppositely displaced bores of adjacent links journaled on corresponding ends of adjacent rods; and link restraining means mounted on the rods between the oppositely displaced bores of adjacent links.

4. A conveyor chain comprising a plurality of spaced substantially parallel flight rods having opposite ends; a plurality of substantially identical elongated links having opposite ends offset from a central plane extended longitudinally of the link and of the conveyor respectively providing outwardly and inwardly facing substantially flat bearing surfaces lying in said central longitudinal plane of the link, said ends of the links having bores therethrough individually disposed on spaced substantially parallel axes transversely of said longitudinal plane of the links to receive said ends of the rod with opposite ends of adjacent links journaled on corresponding ends of adjacent rods; and link restraining means mounted on the rods between the bearing surfaces of the opposite ends of adjacent links.

References Cited by the Examiner

UNITED STATES PATENTS 2,778,480   1/57   Dobbins _____ 198—195

SAMUEL F. COLEMAN, *Acting Primary Examiner.*
WILLIAM B. LA BORDE, *Examiner.*

REEXAMINATION CERTIFICATE (21st)

United States Patent [19]

Raybould

[11] B1 3,160,264

[45] Certificate Issued  Sep. 28, 1982

[54] CONVEYOR CHAIN

[76] Inventor: Delmar H. Raybould, R.F.D. #2, Box 214A, Rexburg, Idaho 83440

Reexamination Request
No. 90/000,028, Jul. 16, 1981

Reexamination Certificate for:
Patent No.: 3,160,264
Issued: Dec. 8, 1964
Appl. No.: 251,887
Filed: Jan. 16, 1963

[51] Int. Cl.$^3$ .............................................. B65G 17/06
[52] U.S. Cl. .................................................... 198/851
[58] Field of Search ............ 198/844, 848, 850, 851, 198/853; 474/206, 219, 220, 223, 224; 171/126

[56] References Cited

U.S. PATENT DOCUMENTS

| | | |
|---|---|---|
| 282,135 | 7/1883 | Warren. |
| 2,778,480 | 1/1957 | Dobbins.............................198/195 |
| 2,787,166 | 4/1957 | Wurzel................................. 74/254 |
| 2,852,129 | 9/1958 | Conner...............................198/853 |
| 3,127,980 | 4/1964 | Lanham..............................198/195 |

FOREIGN PATENT DOCUMENTS 1089391  9/1954  France..............................474/223

OTHER PUBLICATIONS

McGraw-Hill Encyclopedia of Science and Technology, Volume 12, page 390 (Copyright 1960).

*Primary Examiner*—Joseph E. Valenza

[57] EXEMPLARY CLAIM

1. A conveyor chain comprising a plurality of substantially parallel flight rods having opposite end portions; a plurality of substantially identical elongated links interconnecting corresponding ends of the adjacent rods in an endless chain, each link having an outer end providing an inwardly disposed bearing surface, an inner end longitudinally spaced from said outer end providing an outwardly disposed bearing surface in a plane common to the inwardly disposed bearing surface of the outer end, a central portion integrally interconnecting the outer and inner ends and a pair of substantially parallel bores individually extended through the opposite ends of the links, the links having opposite ends journaled on corresponding ends of adjacent rods, the inner ends of the links being outwardly overlapped by the outer ends of adjacent links; and link restraining means mounted on the rods between the overlapped ends of the links.

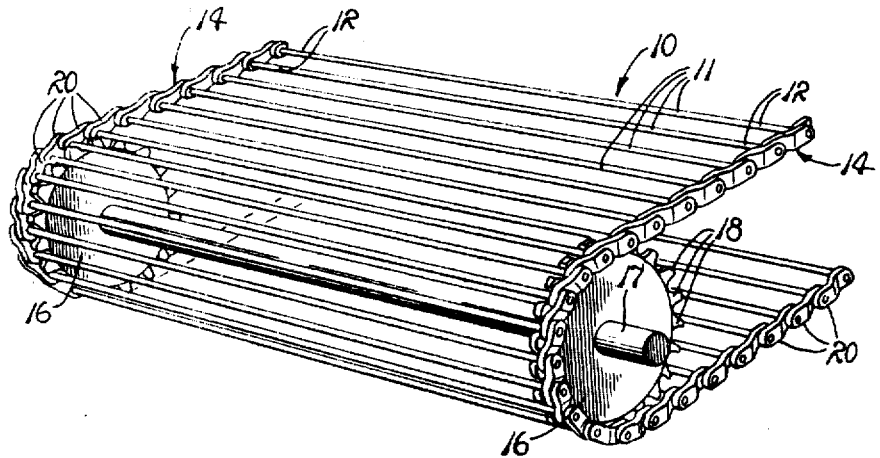

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

Claims 1-4 having been determined to be unpatentable, are cancelled.

* * * * *